United States Patent
Ge et al.

(10) Patent No.: US 10,712,280 B2
(45) Date of Patent: Jul. 14, 2020

(54) HEATED NANO FINGER COLLAPSE FOR CAPTURE OF MOLECULES IN GAS FOR SENSING

(71) Applicant: Hewlett-Packard Development Company, L.P., Houston, TX (US)

(72) Inventors: Ning Ge, Palo Alto, CA (US); Robert G. Walmsley, Palo Alto, CA (US); Helen A. Holder, Palo Alto, CA (US); Steven J. Simske, Fort Collins, CO (US); Anita Rogacs, San Diego, CA (US); Viktor Shkolnikov, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/098,067

(22) PCT Filed: Jul. 22, 2016

(86) PCT No.: PCT/US2016/043485
§ 371 (c)(1),
(2) Date: Oct. 31, 2018

(87) PCT Pub. No.: WO2018/017113
PCT Pub. Date: Jan. 25, 2018

(65) Prior Publication Data
US 2019/0154587 A1    May 23, 2019

(51) Int. Cl.
*G01N 21/65*    (2006.01)
*B82Y 15/00*    (2011.01)

(52) U.S. Cl.
CPC .......... *G01N 21/658* (2013.01); *B82Y 15/00* (2013.01)

(58) Field of Classification Search
CPC .................................................... G01N 21/658
(Continued)

(56) References Cited

U.S. PATENT DOCUMENTS 5,255,067 A    10/1993    Carrabba et al.
6,947,132 B1 *    9/2005    Boss .................. G01J 3/44
                                                                 356/301
(Continued)

FOREIGN PATENT DOCUMENTS

EP          1139098 A2    10/2001
JP          2006275641 A    10/2006
(Continued)

OTHER PUBLICATIONS

Boca, S. et al. Chemiresistive/SERS Dual Sensor Based on Densely Packed Gold NanoparticlesChemiresistive/SERS Dual Sensor Based on Densely Packed Gold Nanoparticles, Dec. 29, 2015, http://www.beilstein-journals.org/bjnano/single/articleFullText.htm?publicId=2190-4286-6-259.
(Continued)

*Primary Examiner* — Tarifur R Chowdhury
*Assistant Examiner* — Omar H Nixon
(74) *Attorney, Agent, or Firm* — Rathe Lindenbaum LLP

(57) ABSTRACT

A gas conduit directs a flow of gas from a gas flow source. A surface enhanced luminescence (SEL) stage is within the conduit and includes a substrate and nano fingers projecting from the substrate. A heater heats the nano fingers to a temperature so as to soften the nano fingers such that the nano fingers collapse towards each other to capture molecules entrained in the gas therebetween.

20 Claims, 7 Drawing Sheets

(58) Field of Classification Search
USPC .......................................................... 356/301
See application file for complete search history.

(56) References Cited

U.S. PATENT DOCUMENTS

| | | | |
|---|---|---|---|
| 7,450,227 B2 | 11/2008 | Dwight et al. | |
| 7,894,056 B2 | 2/2011 | Koo et al. | |
| 2006/0081515 A1 | 4/2006 | Gorbunov et al. | |
| 2012/0105839 A1 | 5/2012 | Novosselov et al. | |
| 2012/0105840 A1* | 5/2012 | Stuke .................. | B82Y 15/00 356/301 |
| 2012/0164745 A1* | 6/2012 | Fu ........................ | G01N 21/658 436/164 |
| 2013/0070241 A1 | 3/2013 | Li et al. | |
| 2013/0195721 A1 | 8/2013 | Li et al. | |
| 2013/0217143 A1* | 8/2013 | Li ........................ | G01N 21/648 436/172 |
| 2013/0278928 A1* | 10/2013 | Mourey ................ | G01N 21/274 356/301 |
| 2014/0024131 A1* | 1/2014 | Kim ...................... | G01N 21/658 436/172 |
| 2014/0218727 A1* | 8/2014 | Li ........................ | G01N 21/658 356/301 |
| 2015/0116706 A1* | 4/2015 | Barcelo ................ | B82Y 15/00 356/301 |
| 2015/0330902 A1* | 11/2015 | Mourey ................ | G01N 21/658 356/301 |
| 2016/0363539 A1* | 12/2016 | Barcelo ................ | B82Y 15/00 |

FOREIGN PATENT DOCUMENTS

| | | |
|---|---|---|
| RU | 2280862 C1 | 7/2006 |
| WO | WO-2012054024 A1 | 4/2012 |

OTHER PUBLICATIONS

Halvorson, R.A. et al., Surface-enhanced Raman Spectroscopy (SERS) for Environmental Analyses, Apr. 17, 2010, http://pubs.acs.org/doi/pdf/10.1021/es101228z.

Boca, S. et al. Chemiresistive/SERS Dual Sensor Based on Densely Packed Gold NanoparticlesChemiresistive/SERS Dual Sensor Based on Densely Packed Gold Nanoparticles, Dec. 29, 2020.

* cited by examiner

HEATED NANO FINGER COLLAPSE FOR CAPTURE OF MOLECULES IN GAS FOR SENSING

BACKGROUND

Surface-enhanced luminescence (SEL) techniques, such as surface-enhanced Raman spectroscopy (SERS), are sometimes used for analyzing the structure of inorganic materials and complex organic molecules. SEL techniques focus electromagnetic radiation or light onto an analyte supported by a stage, wherein the radiation scattered or reflected by the analyte is detected for analysis.

DETAILED DESCRIPTION OF EXAMPLES

Surface enhanced luminescence (SEL) techniques are frequently utilized to detect characteristics of inorganic materials and organic molecules in liquid solutions. Such SEL techniques may utilize nano fingers which close towards one another in response to evaporation of the liquid solution from about the nano fingers. The closed nano fingers capture the molecules (particles) of interest in a gas for enhanced sensing sensitivity. Such SEL techniques are not well-suited for the detection of the characteristics of inorganic materials and organic molecules in a gas phase or volatile compound, wherein evaporation is unavailable to facilitate closure of the nano fingers and capture of the molecules of interest.

The present disclosure describes gas sensing systems that utilize nano fingers as part of such SEL techniques to provide enhanced sensitivity. To capture molecules of interest in the gas for sensing, the gas sensing systems heat the nano fingers to a temperature so as to soften the nano fingers such that the nano fingers collapse towards each other and capture molecules therebetween. In some implementations, light scattered from the molecules in the gas is also sensed to facilitate counting of the molecules.

Figure 1:
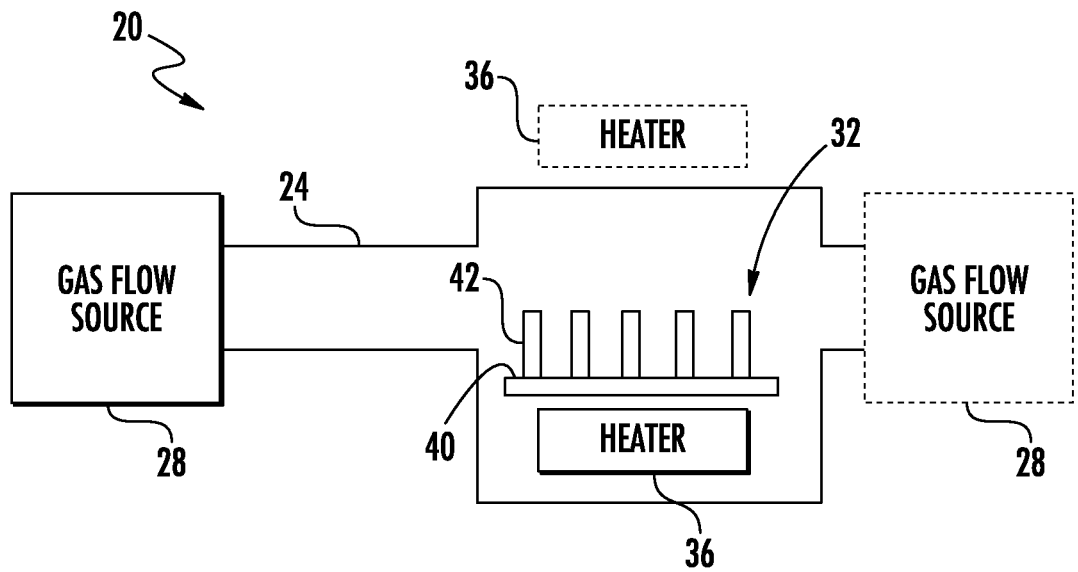
FIG. 1 is a schematic diagram of an example gas sensing system.

FIG. 1 is a schematic diagram of an example gas sensing system 20. Gas sensing system 20 utilizes nano fingers as part of such SEL techniques to provide enhanced sensitivity. To capture floating particle molecules of interest in the gas for sensing, gas sensing system 20 heats the nano fingers to a temperature high enough to soften the nano fingers such that the nano fingers collapse towards each other and capture molecules therebetween. Gas sensing system 20 comprises gas conduit 24, gas flow source 28, surface enhanced luminescence (SEL) stage 32 and heater 36.

Conduit 24 comprises a passage that guides gas flow from gas flow source 28. In one implementation, at least portions of the wall or walls of conduit 624 are transparent so as to transmit light from a light source, such as a laser, onto stage 32 and so as to allow light resulting from the interaction of light with molecules on stage 32 to pass through conduit 624 for collection by a light sensor. For example one implementation, the entirety of conduit 624 is optically transparent. In another implementation, portions of conduit 64 opposite to a SEL light sensor and sensor, and generally above SEL stage 32, may include a transparent portion or transparent window for such transmission of light. In yet other implementations, the SEL light source and sensor alternatively be supported within conduit 24. Conduit 24 may have any of a variety of different sizes and shapes.

Gas flow source 28 comprises a device with supplies a flow of gas through conduit 24 and across stage 32. In one implementation, gas flow source 28 supplies a flow of gas (gas phase molecules or volatile compounds) having molecules less than or equal to 10 nm in diameter. As will be described hereafter, SEL stage 32 is well-suited for capturing such small molecules for subsequent detection and sensing. In one implementation, gas flow source 28 comprises a container enclosing a supply of gas and a gas driver, such as a fan or blower, for directing gas from the supply in a flow through the conduit 24. In another implementation, gas flow source 28 comprises a gas driver, such as a fan or blower, for drawing gas in from the surrounding environment and directing such gas in a flow through conduit 24. As indicated by broken lines in FIG. 1, instead of pushing gas through conduit 24 and across stage 32, gas flow source 28 may alternatively or additionally drawer pull the gas through conduit 24 and across stage 32.

SEL stage 32 comprises substrate 40 and nano fingers 42. Substrate 40 comprises a layer of material which serves as a platform supporting nano fingers 42. Each of nano fingers 42 comprises an upstanding pillar, nano wire, pole, post, column or rod rising up from substrate 40. In one implementation, nano fingers 42 comprise nanoscale enhanced Raman spectroscopy (NERS) structures that may increase the intensity of radiation scattered by the analyte adsorbed on such structures by a factor as high as $10^{16}$. Each of nano fingers 42 is formed from a material that softens in response to being heated to a given temperature. Each of nano fingers 42, upon softening, bends or collapses in a sideways direction towards other nano fingers 42. Such bending or collapse of nano fingers 42 towards one another facilitates the trapping or capture of molecules in the gas being directed by gas flow 28 across stage 32 for SEL sensing.

In one implementation, the nano fingers 42 have a high-aspect ratio such that the length is at least two times longer than the shortest width. The nano fingers may have an aspect ratio ranging from 2:1 to 20:1, with the aspect ratio being based on the longest dimension to the shortest dimension.

Furthermore, each nano fingers 42 may have a width or diameter between 10 nm to 1 μm. In one implementation, nano fingers 42 are spaced apart from one another by a distance of at least 10 nm and no greater than 1 μm. In one implementation, nano fingers 42 are uniformly spaced from one another. In other implementations, nano fingers 42 are non-uniformly spaced from one another, such as where nano fingers 42 are arranged in clusters. In some implementations, at least some nano fingers 42 have asymmetric characteristics, such as being asymmetrically stiff or formed from materials having different modulus of elasticity, so as to tend to bend in one direction versus another direction and so as to bend or collapse in a selected or predetermined direction towards other nano fingers 42.

In one implementation, nano fingers 42 are formed from a polymer. Examples of materials from which nano fingers 42 may be formed to facilitate such softening with the application of heat by the heater 36, include, but are not limited to, polypropylene, poly-3-hydroxybutyrate, ply(vinyl acetate), polychlorotrifluoroethylene, polyamide (Nylone-6,x), polylactic acid, polyethylene terephthalate, poly(vinyl chloride), poly(vinyl alcohol), polystyrene, Poly (methyl methacrylate), acrylonitrile butadiene styrene (ABS), polycarbonate, epoxy (SU8), negative photoresist and Polydimethylsiloxane (PMDS), or combinations thereof.

Heater 36 comprises a device located so as to heat nano fingers 42 to a temperature sufficient to soften at least portions of nano fingers 42 such that nano fingers 42 bend or collapse towards one another, capturing or entrapping molecules therebetween. The collapse of the nano fingers facilitates capture of the molecules. Such capture the molecules between nano fingers may provide enhanced sensing sensitivity and performance.

Once captured by the collapsed or bent nano fingers 42, radiation or light from a light source, such as a laser, is supplied and impinges the trapped molecules of the analyte. The light impinging the trapped molecules interacts with the trapped molecules such that light emanates from the trapped molecules. A sensor is used to collect and sense the light from the trapped molecules. In one implementation, the collected light is light that is reflected from the trapped molecules. In other implementations, depending upon the form of surface enhanced illumination being used, the light collected by the sensor may be the result of other interactions such as scattering or emissions due to excitation.

In one implementation, heater 36 is located below substrate 40. As indicated by broken lines, in other implementations, heater 36 may be provided over or above nano fingers 42. As will be described hereafter, in some implementations, heater 36 may comprise an electrically resistive layer connected to an electrical current, wherein application of electrical current across electric resistive layer outputs heat that heats nano fingers 42 to a temperature so as to soften nano fingers 42 such that they collapse. For example, heater 36 applies heat to heat nano fingers 42 to a temperature above the glass transition temperature of at least portions of nano fingers 42 such that nano fingers 42 collapse towards one another. In some implementations, the degree of collapse or bending is controlled by controlling the temperature and the duration at which temperature of the nano fingers 42 is maintained.

Figure 2:
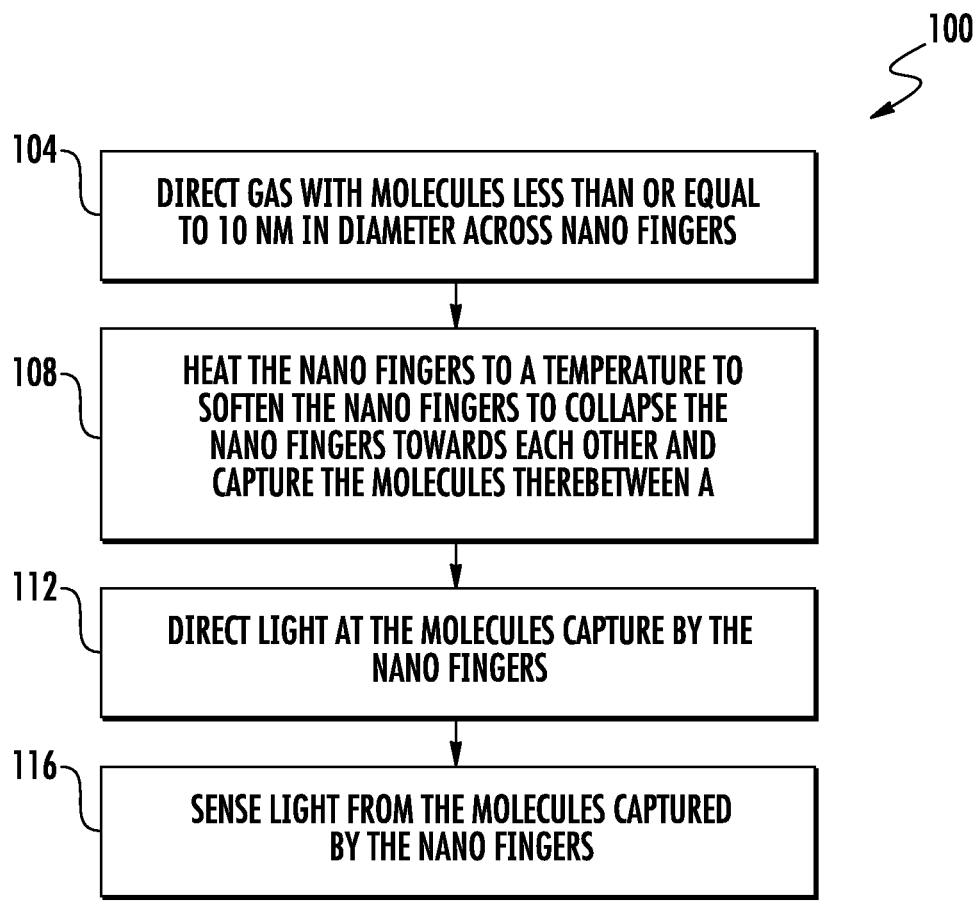
FIG. 2 is a flow diagram of an example method for the sensing of molecules in a gas.

FIG. 2 is a flow diagram of an example method 100 for sensing characteristics of a gas. In particular, FIG. 2 is a flow diagram of an example method 100 for sensing gas phase molecules and/or volatile compounds having molecules of the size less than or equal to 10 nm in diameter. Although method 100 is described in the context of gas sensing system 20, method 100 may be carried out using any of the gas sensing systems described hereafter.

As indicated by block 104, gas flow source 28 directs gas with molecules less than or equal to 10 nm in diameter across the nano fingers 42 of stage 32. In one implementation, the gas is drawn from a container enclosing a supply of gas with a gas driver, such as a fan or blower, that pushes a flow of the gas through the conduit 24 and across nano fingers 42. In another implementation, a gas driver, such as a fan or blower, draws gas in from the surrounding environment and pushes such gas in a flow through conduit 24. In other implementations, the gas is pulled through conduit 24, from a container or from the surrounding environment, across nano fingers 42.

As indicated by block 108, heater 36 heats nano fingers 42 to a temperature to soften nano fingers 42 to nano fingers 42 towards one another to thereby capture the molecules, carried within the gas, therebetween. As illustrated in FIG. 1, in one implementation, the heat may be applied to nano fingers 42 from below substrate 40. In another implementation, the heat may be applied to nano fingers 42 from above nano fingers 42.

As indicated by block 112, at least after such molecules have been in trapped or captured by the collapsed nano fingers 42, light is directed at nano fingers 42 and such trapped molecules. In one implementation, light is provided by a laser. In other implementations, light may be supplied from other sources.

As indicated by block 116, light emanating from the illuminated and trapped molecules is collected and sensed. In one implementation, the light emanating from the illuminated and trapped molecules is a result of light reflecting off of the trapped molecules. In other implementations, the light emanating from the illuminated and trapped molecules may be the result of other interactions of the light directed at the molecules with such molecules. The sensed light may be utilized to determine a characteristic or multiple characteristics of the molecules contained within the gas. The entrapment of the molecules by the nano fingers enhances the sensitivity of the sensing of such molecules in the gas.

Figure 3:
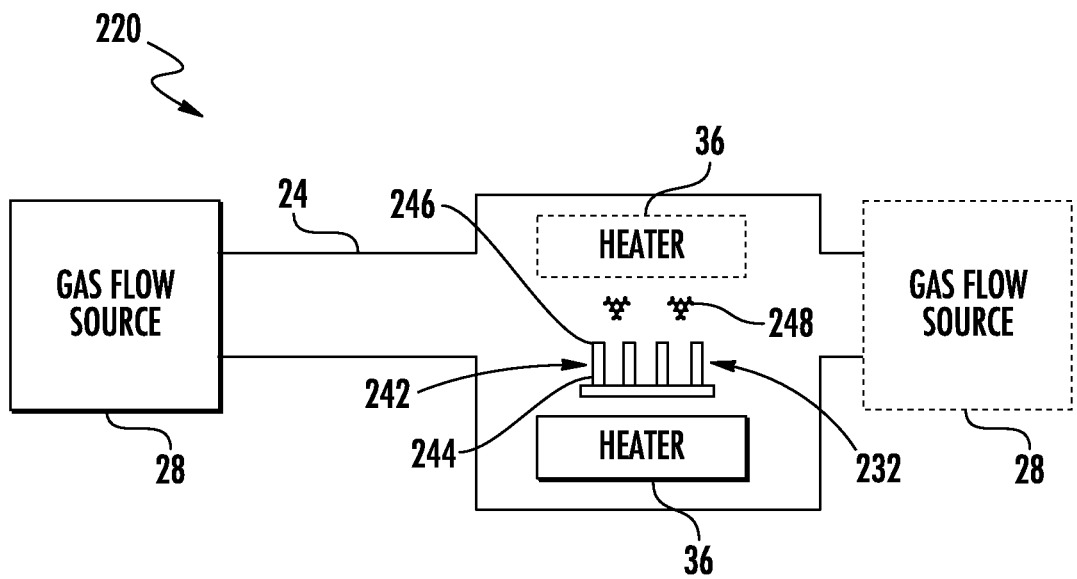
FIG. 3 is a schematic diagram of an example gas sensing system prior to collapse of nano fingers.
Figure 4:
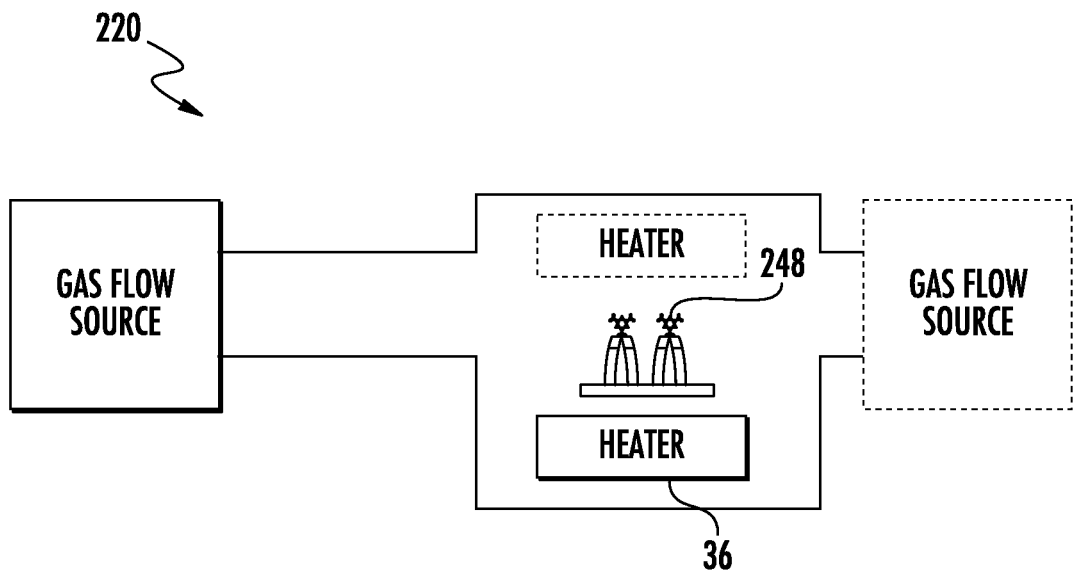
FIG. 4 is a schematic diagram of the example gas sensing system of FIG. 3 after collapse of the nano fingers.

FIGS. 3 and 4 schematically illustrate another example gas sensing system 220 during the sensing method 100. FIG. 3 illustrates system 220 prior to entrapment of molecules by the nano fingers. FIG. 4 illustrates system 220 after such an entrapment of molecules by the nano fingers.

System 220 is similar to system 20 described above, except that system 220 is specifically illustrated as comprising SEL stage 232, an example of SEL stage 32. SEL stage 232 is similar to SEL stage 32 except that SEL stage 232 comprises nano fingers 242. Nano fingers 242 each comprise a pillar portion 244 and a metal tip 246 supported by pillar portion 244. Metal tip 246 comprises a material that enhances plasmonic response by analyte or molecules trapped by nano fingers 242. Metal tip 246 may be formed from metal such as gold, silver, copper, aluminum, platinum, metal oxides and combinations thereof.

As shown by FIG. 3, gas flow source 28 directs a supply of gas of molecules 248 having diameters of less than 10 nm each through conduit 24 and across nano fingers 242. As nano fingers 242 are being exposed to the molecules contained in the gas flow, heater 36 heats nano fingers 242 to a temperature sufficient to soften nano fingers 242 such that the nano fingers 242 collapse towards one another as shown in FIG. 4. In one implementation in which nano fingers 242 comprise pillar portions 244 formed from a polymer, heater 36 heats pillar portions 244 to a temperature above the glass transition temperature of the particular polymer and maintain pillar portion 244 at the elevated temperature until pillar portions 244 have sufficiently collapsed. In one implementation, the elevated temperature and elevated temperature duration are predetermined empirically and are controlled by a controller which controls heater 36. In another implementation, an optical sensor or other sensors may be used to detect the collapse of pillar portion 244 of nano fingers 242, wherein the value of the elevated temperature and the duration of the elevated temperature is achieved by control of heater 36 based upon signals from the optical sensor or the other sensors.

As further shown by FIG. 4, the collapsed nano fingers capture or trap molecules 248. In one implementation, once nano fingers 242 has collapsed, the application of heat by heater 36 may be ended, wherein nano fingers 242 cool and retain their collapsed state or shape. In another implementation, heater 36 continue to apply heat to nano fingers 242 to maintain the material or materials of pillar portions 244 of nano fingers 242 in a softened and collapsed state.

Figure 5:
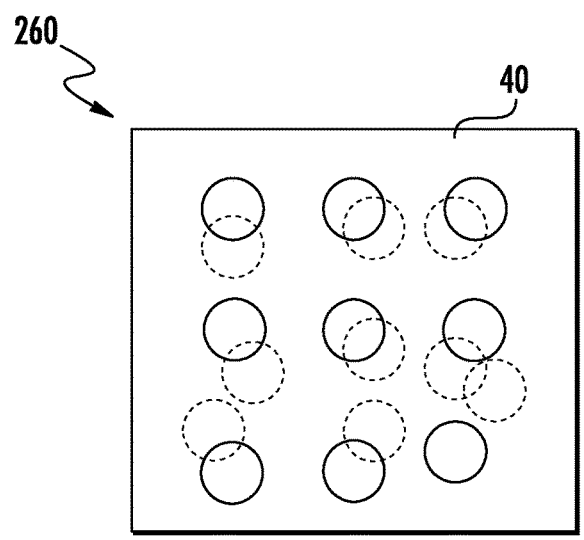
FIG. 5 is a top view of example nano fingers of the gas sensing system of FIG. 3 prior to and after collapse of the nano fingers.

FIG. 5 is a top view illustrating one example arrangement 260 of nano fingers 242 upon stage 40, within conduit 24, before and after the collapse of nano fingers 242 in response to heat from heater 36. As shown in solid lines in FIG. 5, in one implementation, nano fingers 242 are arranged in a two dimensional array or grid. In one implementation, the heat induced softening of nano fingers 242 causes nano fingers 242 to collapse and tilt or bend in random directions (as indicated in broken lines) with some nano fingers collapsing towards other nano fingers to provide enhanced light sensing response or enhanced plasmonic response such as in the case of surface enhanced Raman spectroscopy (SERS).

Figure 6:
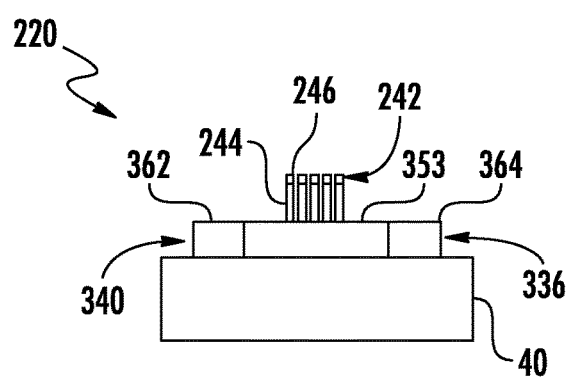
FIG. 6 is a sectional view of the example nano fingers of the example gas sensing system of FIG. 3 with an example heater.
Figure 7:
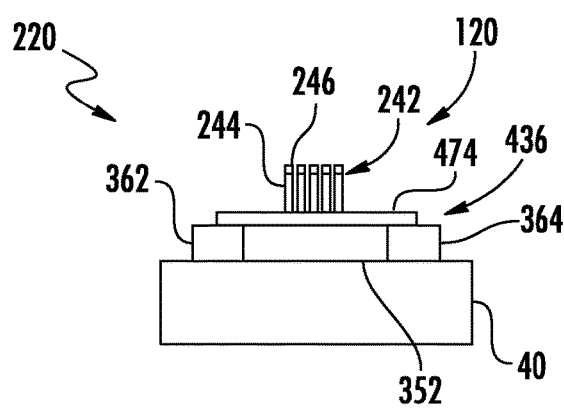
FIG. 7 is a sectional view of the example nano fingers of the example gas sensing system of FIG. 3 with an example heater.
Figure 8:
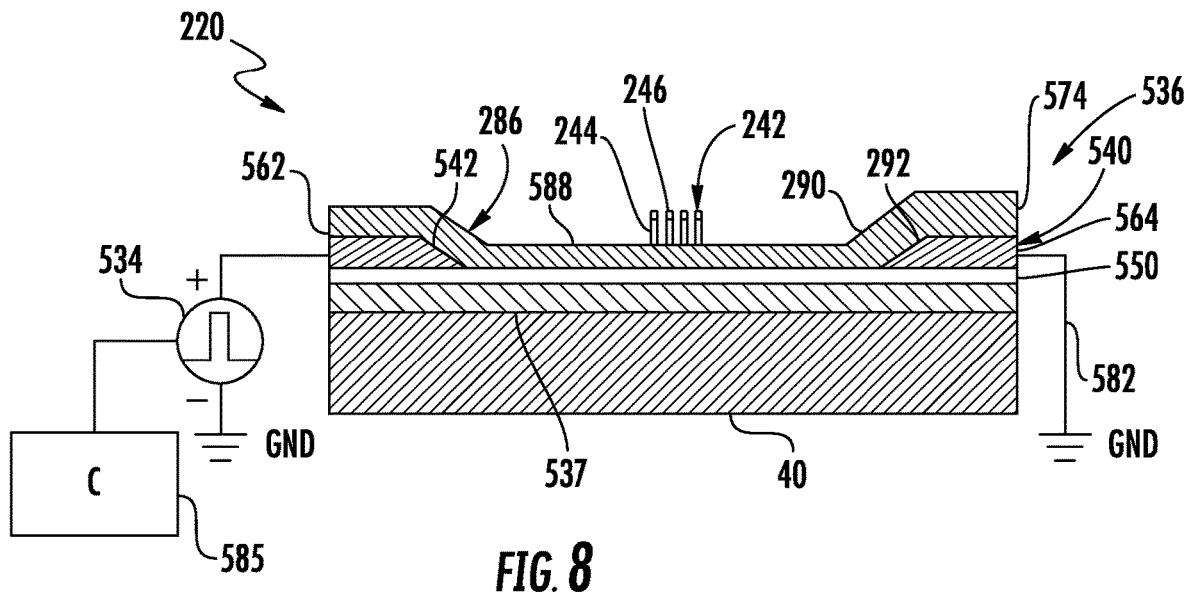
FIG. 8 is a sectional view of the example nano fingers of the example gas sensing system of FIG. 3, prior to their collapse, with an example heater.

FIGS. 6-8 illustrate various examples of different heaters that are used to heat the nano fingers within conduit 24. FIG. 6 is a sectional view illustrating one example heater 336 provided upon substrate 40 and underlying nano fingers 242. Heater 336 comprises electrically conductive layer 340 and electrically resistive layer 350. Electrically conductive layer 340 comprises a layer of electrically conductive material. Layer 340 comprises a first portion 32 and a second portion 364 spaced from the first portion 362 by a gap. One of portions 362, 364 is to be electrically connected to a source of electrical current while the other of portions 362, 364 is to be electrically connected to ground. In the example illustrated, one of portions 362, 364 is to be electrically connected to a pulse voltage supply while the other of portion 362, 364 is to be electrically connected to ground. In one implementation, electrically conductive portions 362, 364 of electrically conductive layer 340 are formed from a same material. In one implementation, portions 362, 364 are formed from electrically conductive material having an electrical resistance less than or equal to 0.04-0.1 ohm/square. In one implementation, portions 62, 64 formed from an electric conductive material including, but not limited to, Al, AlCu, AlCuSi, Cu, Ti, TiN, Ta, W, Mo, Pt and Au. In one implementation, portions 362, 364 of layer 340 have a thickness of 4000-10000 Angstroms and a sheet resistance of 0.04-0.08 ohms/sq.

Electrically resistive layer 350 comprises an electrically resistive layer in contact with and extending between portion 362 and 364 of layer 340. Electrically resistive layer 350 is formed from a material or multiple materials which conduct electrical current and which emit heat as a result. Electrically resistive layer 350 forms an electrically resistive bridge across the gap between portions 362, 364. Electrical current flows through electrically resistive layer 350 to heat nano fingers 242.

In one implementation, electrically resistive layer 350 is formed from a material and has a thickness so as to emit heat at a rate of at least 10 degrees Celsius per microsecond so as to warm nano fingers 242 and the surfaces about the environment of nano fingers 242 to a temperature of at least 50° C. In one implementation, electrically resistive layer 350 is formed from a material and having a thickness so as to emit heat when conducting electrical current so as to warm nano fingers 242 and the surfaces about the environment of nano fingers 242 to a temperature above a glass transition temperature Tg of the polymer or polymers of nano fingers 242 but less than or equal to the lower of (a) a decomposition temperature of the analyte of interest on such nano fingers 242 and (b) a detachment temperature, the temperature at which the analyte of interest will leave or become detached from the surface of the nano fingers 242. In one implementation, electrically resistive layer 350 has an electrical sheet resistance of at least 30 ohm/square and no greater than 900 ohm/square. In one implementation, electrically resistive layer 350 is formed from TaAl and has a thickness of 950 Angstroms, and a sheet resistance of 30 ohms/sq. Examples of materials from which electrically resistive layer 50 may be formed include, but are not limited to, TaAl, WSiN, TaAiN, TiN TaC, Ta, W, Pt, RuO2, MnOx, $In_2O_3$, SnO2, ITO and ZTO, as well as alloys thereof.

FIG. 7 is a sectional view illustrating one example heater 436 provided upon substrate 40 and underlying nano fingers 242. Heater 436 is similar heater 336 except that heater 436 additionally comprises passivation layer 474. Passivation layer 174 comprises a layer between the heat emitting electrically resistive layer 50 and nano fingers 42. Passivation layer 474 protects electrically resistive layer 350 from interactions with the analyte containing liquid that is applied to nano fingers 242. Passivation layer 474 may additionally inhibit interactions between the liquid and electrically resistive layer 350 which might otherwise contaminate the solution and analyte being tested. Examples of materials from which passivation layer 474 may be formed include, but are not limited to, SiN, SiC, HfOx, $SiNO_x$, $Al_2O_3$, $Ta_2O_5$ and $SiO_x$. In one implementation, passivation layer 474 has a thickness of at least 100 Angstroms and no greater than 8000 Angstroms.

FIG. 8 is a sectional view illustrating another example heater 536 for heating nano fingers 242. Heater 536 is supported on substrate 40 and comprises interlayer dielectric 537, electrically conductive layer 540, electrically resistive layer 550, passivation layer 574, ground 582 (schematically shown), pulse voltage supply 584 (schematically shown) and controller 585.

Interlayer dielectric 537 comprises a layer of dielectric material sandwiched between substrate 40 and electrically resistive layer 550. Interlayer dielectric 537 electrically insulates electrically resistive layer 550 from substrate 40. In one implementation, interlayer dielectric 537 may comprise a material having a greater electric resistivity as compared to selectively resistive layer 550, such as $SiO_2$ or TEOS. In other implementations, interlayer dielectric 226 may comprise other dielectric materials.

Electrically conductive layer 540 is similar to layer 340 described above except that electric conductive layer 540 is formed on top of electrically resistive layer 550. Electrically conductive layer 540 comprises spaced portions 562 and 564 which conduct electrical current across the underlying electrically resistive layer 550. In the example illustrated, portion 562 of electrically conductive layer 540 is electrically connected to pulse voltage supply 584 on a first side of layer 540 while portion 564 is elected connected to ground 582 on a second side of layer 540.

In the example illustrated, portions 562, 564 are spaced by a gap and cooperate with passivation layer 574 to define and form the shape of a depression or concavity 586 having a floor 588 and sides 590, wherein passivation layer 574 follows the shape formed by the underlying selectively resistive layer 550 and the underlying portions 562, 564. Floor 588 supports nano fingers 242 which rise from floor 588. Sides 590 rise above floor 588.

In one implementation, electrically conductive portions 562, 564 of electrically conductive layer 540 are formed from a same material. In one implementation, portions 562, 564 are formed from an electrically conductive material having an electrical resistance less than or equal to 0.04-0.1 ohm/square. In one implementation, portions 562, 564 formed from an electric conductive material including, but not limited to, Al, AlCu, AlCuSi, Cu, Ti, TiN, Ta, W, Mo, Pt and Au. In one implementation, portions 562, 564 of layer 340 have a thickness of 4000-10000 Angstroms and a sheet resistance of 0.04-0.08 ohms/sq. In one implementation, portions 562, 564 of layer 540 have a thickness of 950 Angstroms and a sheet resistance of 425 ohms/sq.

Electrically resistive layer 550 is similar to electrically resistive layer 250 described above except that layer 550 underlies portion 562, 564 of electrically conductive layer 340 and passivation layer 574. Electrically resistive layer 550 comprises a flat planar layer horizontally extending below in contact with portions 562, 564 as well as passivation layer 574. As with electrically resistive layer 250, electrically resistive layer 550 forms an electrically resistive bridge spanning between portions 562, 564.

In one implementation, electrically resistive layer 550 is formed from a material and having a thickness so as to emit heat at a rate of at least 10° C. per microsecond so as to warm nano fingers 242 and the surfaces about the environment of nano fingers 242 to a temperature above a glass transition temperature Tg of the polymer or polymers of nano fingers 242 but less than or equal to the lower of (a) a decomposition temperature of the analyte of interest on such nano fingers 242 and (b) a detachment temperature, the temperature at which the analyte of interest will leave or become detached from the surface of the nano fingers 242. In one implementation, electrically resistive layer 550 has an electrical sheet resistance of at least 30 ohm/square and no greater than 900 ohm/square. In one implementation, electrically resistive layer 250 is formed from TaAl and has a thickness of 950 Angstroms, and a sheet resistance of 30 ohms/sq. Examples of materials from which electrically resistive layer 550 may be formed include, but are not limited to, TaAl, WSiN, TaAiN, TiN TaC, Ta, W, Pt, RuO$_2$, MnOx, In$_2$O$_3$, SnO$_2$, ITO and ZTO, as well as alloys thereof.

Passivation layer 574 is similar to passivation layer 474 described above, except that passivation layer 574 overlies and takes the shape of the underlying electrically resistive layer 550 and portions 562, 564 of electrically conductive layer 540 to form the above described concavity 586. Passivation layer 574 protects electrically resistive layer 550 from interactions with the gas. Passivation layer 574 may additionally inhibit interactions between the gas and electrically resistive layer 550 which might otherwise contaminate the solution and analyte being tested. Examples of materials from which passivation layer 574 may be formed include, but are not limited to, SiN, SiC, HfOx SiNO$_x$, Al$_2$O$_3$, Ta$_2$O$_5$ and SiO$_x$. In one implementation, passivation layer 574 has a thickness of at least 100 Angstroms and no greater than 8000 Angstroms.

Ground 582 is electrically connected to portion 564. Pulse voltage supply 584 is electrically connected to portion 562. Controller 585 comprises a processing unit that controls the output of pulse voltage supply 584. In some implementations, controller 585 may control other devices or operations of sensing system 220 as well.

For purposes of this application, the term "processing unit" shall mean a presently developed or future developed computing electronics or hardware that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 585 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 9:
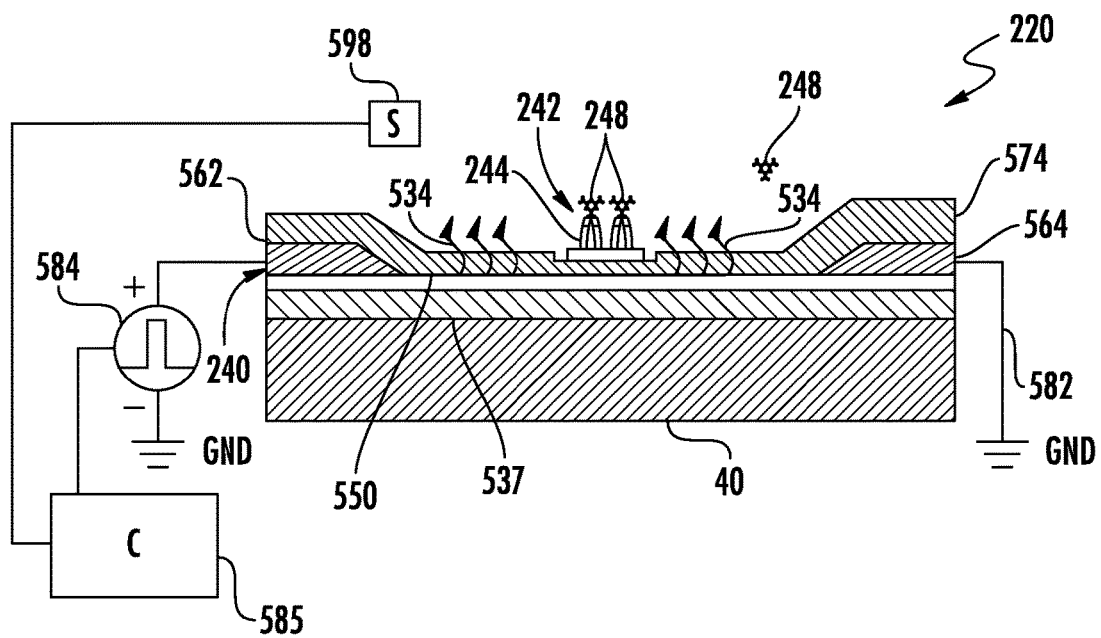
FIG. 9 is a sectional view of the example nano fingers of the example gas sensing system of FIG. 3, following their collapse.

FIG. 9 illustrates heat being applied to nano fingers 242 to facilitate closing of the nano fingers and improve performance of the sensor. As will be described hereafter, the heat is applied to the nano fingers to temporarily soften the nano fingers during use of the sensor such that they more easily bend to facilitate closure of the nano fingers for testing. By facilitating or enhancing closure of the nano fingers, the sensitivity and performance of the sensor may be enhanced.

As shown by FIG. 9, controller 585, following instructions in a non-transitory computer-readable medium, outputs control signals causing pulse voltage supply 584 to supply pulses of electrical current to portion 562 of electrically conductive layer 540. The electrical current is conducted across electrically resistive layer 550 to portion 562 and to ground 582. As electric current is conducted across electrically resistive layer 550 between portions 562 and 564, heat (indicated by arrows 534) is generated and passed through passivation layer 574 to heat nano fingers 242. A sufficient amount of heat 534 is provided so as to soften or make more pliable the pillars 244 of nano fingers 242. As a result, nano fingers 242 may bend or towards one another to facilitate enhanced sensing.

In one implementation, the softening of pillars 244 by heat 534 is a result of electrical resistive layer 550 converting the electrical energy into heat so as to heat pillars 244 to a temperature above a glass transition temperature Tg of the material or materials of pillars 244. The amount of energy to be applied to soften pillars 244 may be determined by multiplying (a) the specific heat capacity of the material or composition of each pillar 244, (b) the temperature difference between the current temperature and the glass transition temperature multiplied and (c) the amount of material or size of each pillar 244. In one implementation, controller 585 controls the application of pulses of electric currents us to heat pillars 244 to a temperature of at least 80° C. In one implementation, each pillar 244 may be formed from a polymer that may be softened. Examples of materials from which pillars 244 may be formed to facilitate such softening with the application of heat by the heater formed by portions 562, 564 and layer 550 include, but are not limited to, polypropylene, poly-3-hydroxybutyrate, ply(vinyl acetate), polychlorotrifluoroethylene, polyamide (Nylone-6,x), polylactic acid, polyethylene terephthalate, poly(vinyl chloride), poly(vinyl alcohol), polystyrene, Poly(methyl methacrylate), acrylonitrile butadiene styrene (ABS), polycarbonate, epoxy (SU8), negative photoresist and Polydimethylsiloxane (PMDS), or combinations thereof.

In one implementation, controller 585 causes supply 284 to supply electrical current that produce heat and softens pillars 244 so as to facilitate a plastic or elastic the formation of pillars 244 to further facilitate collapse of such pillars 244. In one implementation, each pillar 244 is softened to a degree such that each of pillars 244 plastically or elastically deforms to bend and move in a direction towards and adjacent nano finger 42 by a distance of at least one half of the diameter of nano finger 242. In one implementation, controller 585 outputs control signals causing supply 584 to cause supply 584 to provide electrical pulses to portion 562 for a predetermined empirically determined amount of time with predetermined pulse widths and amplitudes so as to soften pillars 244 by a predetermined extent to facilitate bending.

In another implementation, controller 585 may adjust the duration or characteristics of the electrical pulses supplied by supply 584 based upon sensed feedback from at least one sensor, such as an optional sensor 598. For example, in one implementation, sensor 598 may comprise an optical sensor. In other implementations, such an optical sensor may be provided by an external device, such as SERS detector and analyzer. In such implementations, the optical sensor senses the bending of nano fingers 242, wherein controller 585 adjusts the duration or characteristics of the electrical pulses supplied by supply 584 based upon the sensed bending of nano fingers 242 during the application of heat. In another implementation, sensor 298 may comprise a temperature sensor which senses the temperature of the environment about nano fingers 242, wherein controller 585 adjusts the duration or characteristics of the electrical pulses supplied by supply 584 based upon closed-loop feedback regarding the temperature about nano fingers 242.

Figure 10:
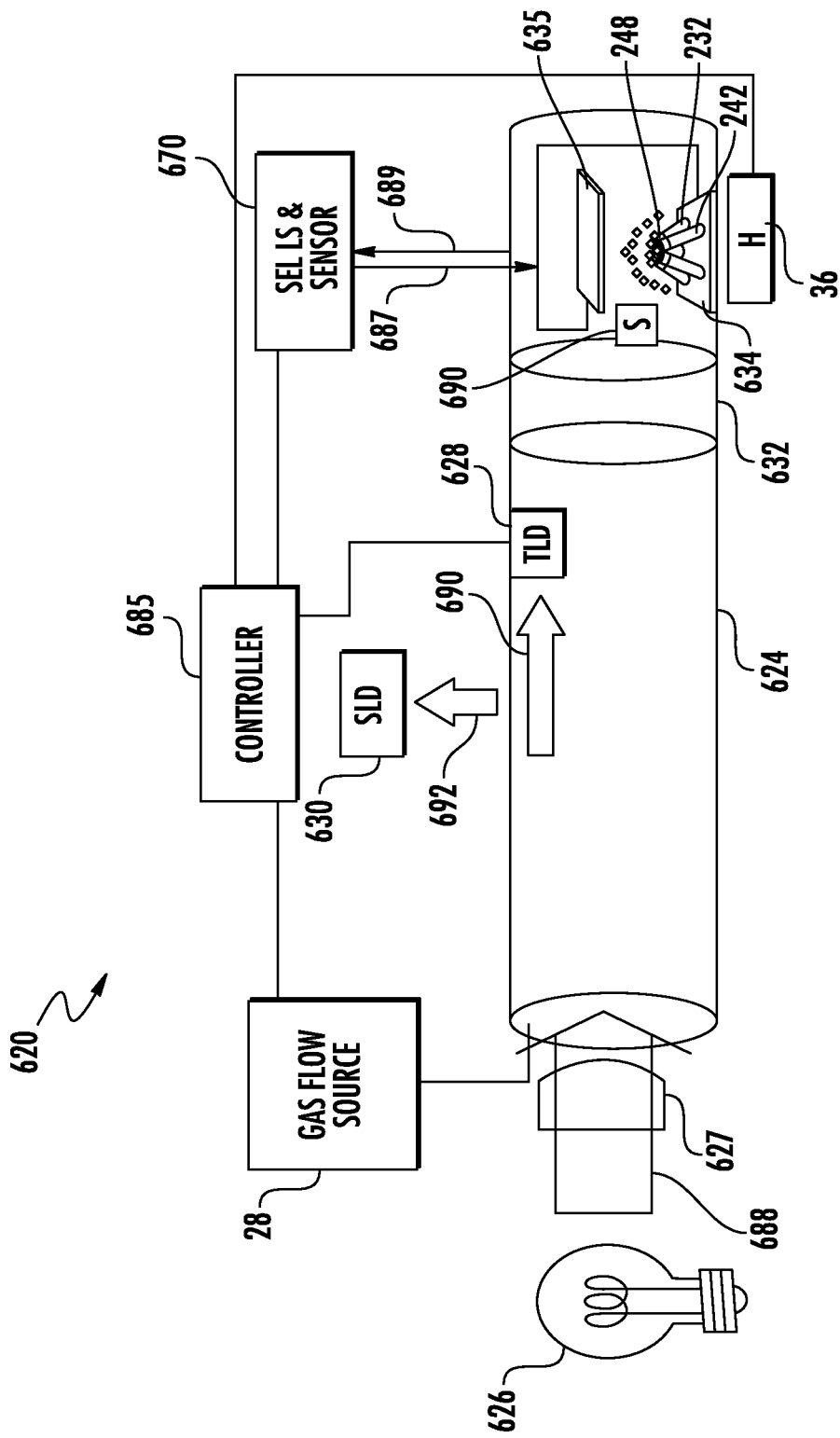
FIG. 10 is a sectional view schematically illustrating an example gas sensing system.

FIG. 10 schematically illustrates an example gas sensing system 620. Gas sensing the system 620 performs to separate sensing operations with respect to a gas flow: (1) system 620 counts particles or molecules in a gas flow using sensed light scattering and (2) determines characteristics of the molecules in the gas flow by collapsing nano fingers to trap such molecules which are illuminated, wherein the light interactions with the molecules are sensed. As will be described hereafter, system 620 further employees a static electric field across the nano fingers to facilitate the collection and trapping of molecules by the nano fingers. System 620 comprises gas conduit 624, gas flow source 28 (described above), first light source 626, lens 627, transmitted light detector 628 scattered light detector 630, filter 632, SEL stage 232 (described above), nano finger electrode 634, counter electrode 35, heater 36 (described above), SEL light source and sensor 670 and controller 685.

Conduit 624 is similar conduit 24 described above in that conduit 624 comprises a passage that guides gas flow from gas flow source 28. In the example illustrated, at least portions of conduit 624 are transparent so as to allow light scattered from particles or molecules within conduit 624 to be received by scattered light detector 634 and so as to allow light to be directed through conduit 624 onto stage 232 and so as to allow light resulting from interactions with the trapped molecules on stage 232 to be received by SEL sensor 670. In yet other implementations, detector 634 and/or SEL light source and sensor 670 alternatively mounted within our along the interior of conduit 624. Conduit 24 may have any of a variety of different sizes and shapes.

Light source 626 comprises a source of light range to direct light 688 through an along conduit 624, such as along a centerline of conduit 624. Light 688 has a wavelength so as to scatter when impinging particles or molecules within conduit 624. Lens 627 focuses such light along conduit 624. In some implementations, lens 627 may be omitted.

Transmitted light detector 628 comprise a sensor arranged so as to detect light 690 from source 626 that has passed scattered light detector 630, without being scattered by particles or molecules within conduit 624. Scattered light detector 630 comprise a sensor range to detect light 692 from source 626 that has been scattered from particles or molecules within the gas within conduit 624. In one implementation, scattered light detector 630 faces in a direction nonparallel to the centerline of conduit 624. Scattered light detector 630 senses beams of scattered light in directions perpendicular to the centerline of conduit 624, perpendicular to the direction of the beams of light emitted by light source 626.

Filter 632 extends at least partially across the interior of conduit 624. Filter 632 filters out or prevents the passage of larger particles. Filter 632 filters out the larger particles that may interfere with the trapping of molecules by stage 232. In one implementation, filter 632 filters out particles having a diameter of at least 20 nm. In some implementations, system 620 may include multiple filters, each of the filters removes larger particles in a step wise or stage manner as the gas flows along conduit 624. In some implementations, depending upon the characteristic of the gas from gas flow source 28, filter 632 may have other filtering properties or may be omitted.

Electrodes 634 and 635 comprise electrodes along conduit 624, after filter 632, that cooperate to form a static electric field across nano fingers 242 of stage 232 to facilitate collection of molecules on nano fingers 242. The static electric field generated by electrodes 634 and 635 does not change the composition of the molecules due to such electrical charging. In one implementation, electrodes 634, 635 are located external to conduit 634. In another implementation, electrodes 634, 635 are internally located within conduit 24. In the example illustrated, nano finger electrode 634 is located on one side of nano fingers 242, such as below substrate 40, whereas counter electrode 635 is located above nano fingers 242, such as along the upper interior wall surface of conduit 624. In some implementations, electrodes 634, 635 may be omitted.

SEL light source and sensor 670 (schematically illustrated) comprises a second light source that directs light (as indicated by arrow 687) onto the trapped molecules of nano fingers 242. In one implementation, the second light source comprises a laser. SEL light source and sensor 670 additionally comprises a light sensor that collects and senses light (as indicated by arrow 689) emanating from the molecules 248 trapped by the collapsed nano fingers 242. In one implementation, light 689 comprises light reflected from such, such as with surface enhanced Raman spectroscopy. Another implementation, light 689 comprises light emitted our discharge from molecules 248.

Figure 11:
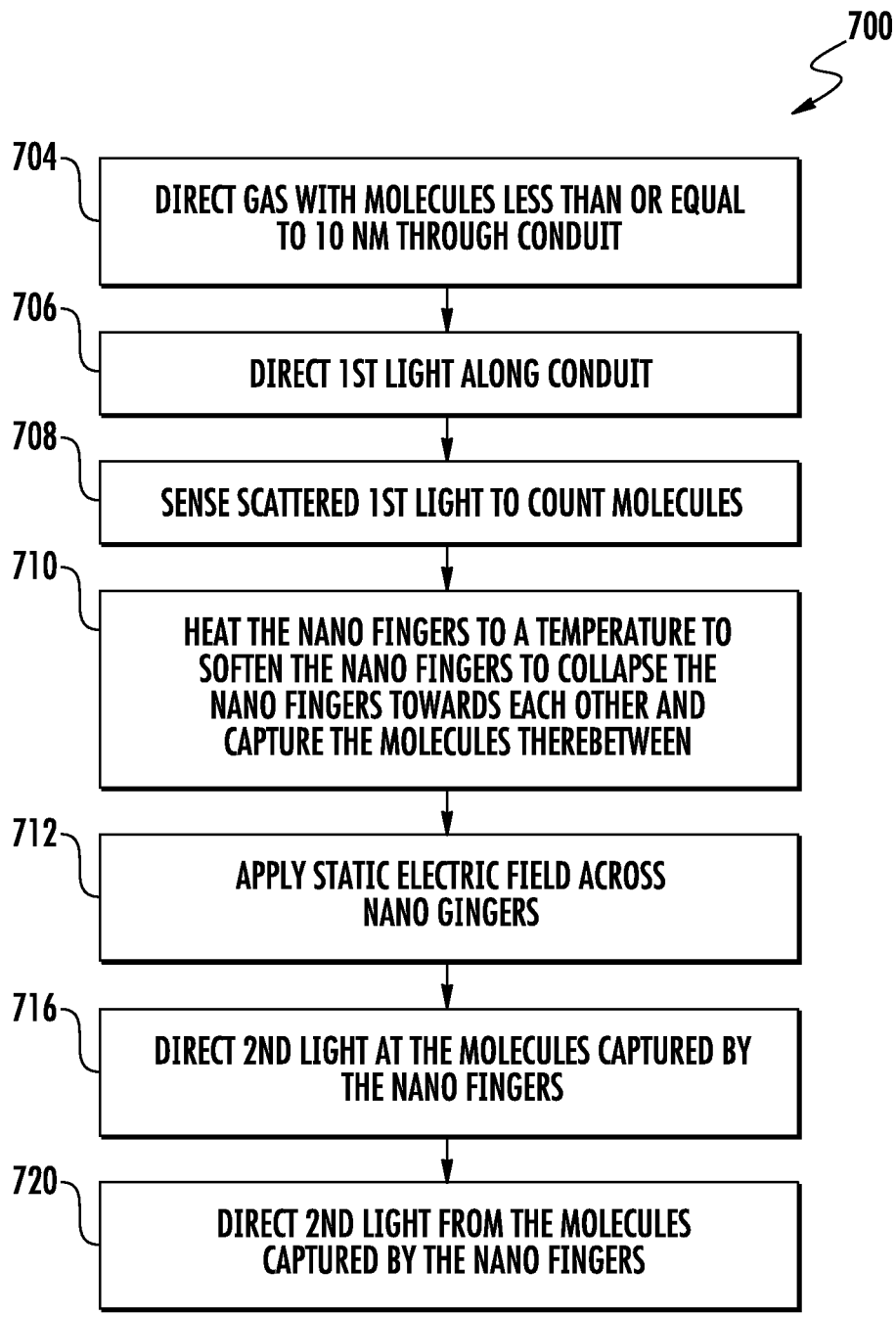
FIG. 11 is a flow diagram of an example method for counting and sensing molecules in a gas.

Controller 685 comprises a processing unit that follows instructions contained in a non-transitory computer-readable medium to control the various components of gas sensing system 620. In one implementation, controller 685, following such instructions, carries out an example method 700 as illustrated by the flow diagram of FIG. 11. As indicated by block 704, controller 685 outputs control signals causing gas flow source 28 to direct gas with molecules less than or equal to 10 nm in diameter through conduit 624. In one implementation, the gas drawn from the surrounding environment. In another implementation, the gas is drawn from a container containing the gas.

As indicated by block 706, controller 685 causes light source 626 to direct light 688 along conduit 624. The light 688, upon impinging particles within conduit 624 scatters, with light 690 impinging transmitted light detector 628 and with the scattered light impinging scattered light detector 630. As indicated by block 708, scattered light detector 630 senses a scattered light. Controller 685 receives signals from transmitted light detector 628 and scattered light detector 630. Based upon such signals, controller 685 may determine a count or number of particles in the gas.

As indicated by block 710, controller 685 outputs control signals directing heater 36 to heat nano fingers 242 to a temperature to soften the nano fingers to collapse the nano fingers 242 towards each other and capture molecules 248 therebetween. In response to signals from controller 685, heater 36 heats nano fingers 242 to a temperature above the glass transition temperature of the materials forming nano fingers 242. As indicated by block 712, prior to or during the collapsed such nano fingers 242, controller 685 further outputs control signals causing electrical current to be supplied to at least one of electrodes 634, 635 so as to create and apply a static electric field across nano fingers 242. The static electric field charges such molecules and assists in the collection and entrapment of molecules upon nano fingers 242. In some implementations, the application of the electric field as indicated in block 712 may be omitted.

As indicated by block 716, controller 685 outputs control signals causing SEL light source and sensor 670 to direct a second light at the molecules 248 captured by nano fingers 242. As indicated by block 720, SEL light source and sensor 670 senses the light from the molecules 248 captured by nano fingers 242. Sensor 670 captures and senses the light and outputs signals based upon the sensed light. In one implementation, light sensed by sensor 670 comprise reflected light. In other implementations, the light sensed by sensor 670 is the result of other interactions with molecules 248. Controller 685 determines characteristics of the molecules, such as identification of the molecules, a determination the size or density of such molecules or the like based upon such signals from sensors 670.

Figure 12:
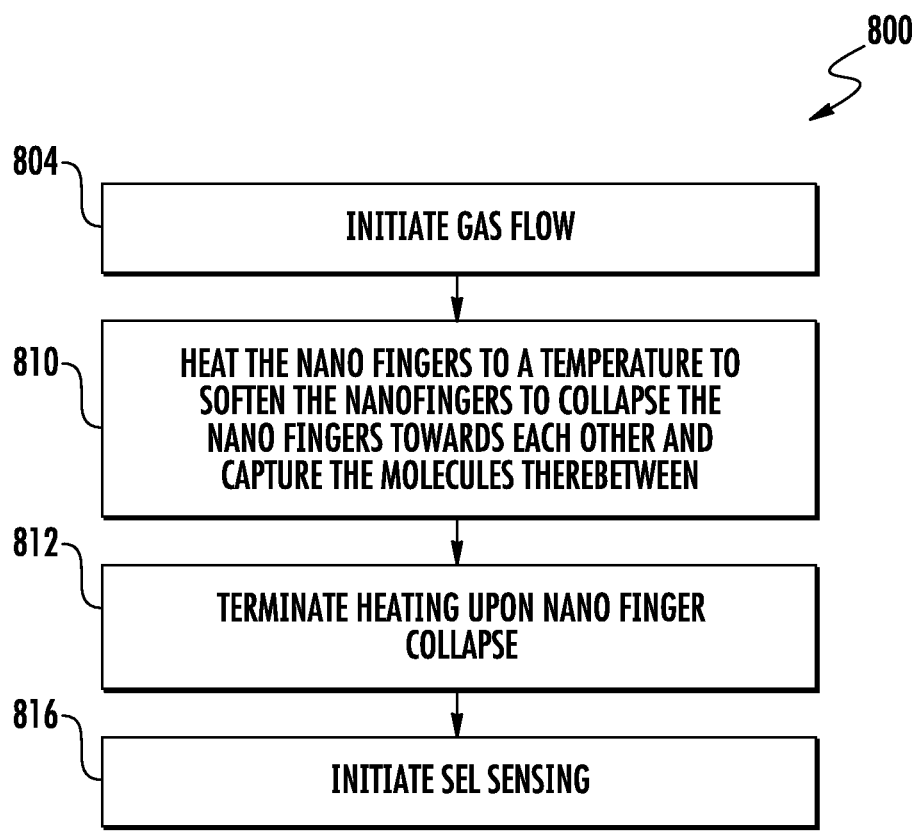
FIG. 12 is a flow diagram of an example method for carrying out SEL sensing of molecules in a gas.

In one implementation, controller 685 controls the operation of gas sensing system 620 according to method 800 shown in FIG. 12. As indicated by block 804, controller 685 outputs control signals to initiate gas flow by gas flow source 28. As indicated by block 810, controller 685 outputs control signals directing heater 36 to heat nano fingers 242 to a temperature to soften the nano fingers to collapse the nano fingers 242 towards each other and capture molecules 248 therebetween. In response to signals from controller 685, heater 36 heats nano fingers 242 to a temperature above the glass transition temperature of the materials forming nano fingers 242. As indicated by block 812, controller terminates the application of heat by heater 36 in response to the nano fingers collapsing. In one implementation, controller 685 terminates or adjusts the application of heat by heater 36 upon expiration or lapse of a predetermined and stored amount of time, the predetermined time amount being empirically determined. In another implementation, controller 685 terminates the application of heat or adjusts the application of heat based upon a sensed state of nano fingers 242. For example, in one implementation, optical sensors or other sensors 690 used to detect the extent or degree of collapse of nano fingers 242, wherein controller 685 controls the application of heat by heater 36 based upon the detected degree of collapse of nano fingers 242. As indicated by block 816, upon the expiration of the predetermined time amount or the sensed collapse of nano fingers 242 controller 685, controller 685 outputs control signals initiating SEL sensing by SEL light source and sensor 670, carrying out the steps identified in blocks 716 and 720 as described above.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompasses a plurality of such particular elements.

What is claimed is:

1. An apparatus comprising:
a gas flow source;
a gas conduit to direct a flow of gas from the gas flow source;
a surface enhanced luminescence (SEL) stage within the conduit, the stage comprising: a substrate; and
nano fingers projecting from the substrate; and a heater to heat the nano fingers to a temperature so as to soften the nano fingers such that the nano fingers collapse towards each other to capture molecules entrained in the gas therebetween for being sensed.

2. The apparatus of claim 1, wherein the nano fingers are arranged in a two-dimensional array on the substrate.

3. The apparatus of claim 1, wherein the heater is located below the nano fingers.

4. The apparatus of claim 1 further comprising:
a light emitter to impinge the nano fingers with light; and
a light sensor to be illuminated by light from the nano fingers.

5. The apparatus of claim 4 further comprising:
a second light emitter to direct light along a centerline of the conduit; and
a second light sensor to receive light scattered from particles in gas in the conduit, the second light sensor facing in a direction nonparallel to the centerline of the conduit.

6. The apparatus of claim 5 further comprising a filter across the conduit between the light sensor and the second light sensor.

7. The apparatus of claim 1 further comprising:
a first electrode on a first side of the nano fingers;
a second electrode on a second side of the nano fingers, wherein the first electrode and the second electrode apply static field to bias particles towards the nano fingers.

8. The apparatus of claim 1, wherein the nano fingers are asymmetric so as to collapse in a predetermined direction.

9. The apparatus of claim 1, wherein the nano fingers are formed from a material having a glass transition temperature and wherein the apparatus further comprises a controller outputting signals causing the heater to heat the nano fingers to the temperature, the temperature being greater than the glass transition temperature.

10. The apparatus of claim 1 further comprising:
a sensor to sense a collapsed state of the nano fingers; and
a controller to control application of heat by the heater based upon signals from the sensor.

11. The apparatus of claim 1, wherein the nano fingers are formed from a polymer having a glass transition temperature, wherein the molecules have a decomposition temperature, wherein the molecules have a detachment temperature at which the molecules detach from the nano fingers and wherein the heater is to heat the nano fingers to a temperature above the glass transition temperature but less than or equal to a lower of the decomposition temperature and the detachment temperature.

12. The apparatus of claim 1 further comprising:
a substrate;
an electrically conductive layer supported by the substrate, the electrically conductive layer having a first portion for being connected to a power source and a second portion for connection to ground, the first portion and the second portion being spaced by a gap;
an electrically resistive layer spanning the gap between the first portion and the second portion to electrically connect the first portion and the second portion;
a passivation layer between the electrically resistive layer and the nano fingers, wherein the electrically conductive layer and the electrically resistive layer form the heater.

13. A method comprising:
directing gas with molecules across nano fingers;
heating the nano fingers to a temperature to soften the nano fingers so as to collapse the nano fingers towards each other and capture the molecules therebetween;
directing light at the particles captured by the collapsed nano fingers; and
sensing light collected from the molecules captured by the collapsed nano fingers.

14. The method of claim 13 further comprising terminating the heating of the nano fingers in response to collapse of the nano fingers.

15. The method of claim 13 further comprising applying a static electric field to bias the particles towards the nano fingers.

16. The method of claim 13 further comprising:
directing light along a centerline of the conduit;
sensing light scattered from the particles to detect the particle count from the sensed scattered light.

17. The method of claim 16 further comprising filtering the gas flow following the scattering of the light by the particles in the gas flow and prior to the gas flow reaching the nano fingers.

18. An apparatus comprising:
a gas conduit to direct a gas; a surface enhanced Raman spectroscopy sensor within the conduit, the sensor comprising:
a substrate; and
nano fingers projecting from the substrate;
a heater to heat the nano fingers to a temperature so as to soften the nano fingers such that the nano fingers collapse towards each other and capture molecules in the gas therebetween;
a first light emitter to impinge the nano fingers with light;
a first light sensor to receive reflected light from the nano fingers;
a second light emitter to direct light along a centerline of the conduit; and
a second light sensor to receive light scattered from molecules in the conduit, the second light sensor facing in a direction nonparallel to the centerline of the conduit.

19. The apparatus of claim 18 further comprising a filter across the conduit between the first light sensor and the second light sensor.

20. The apparatus of claim 18 further comprising:
a first electrode on a first side of the nano fingers; and
a second electrode on a second side of the nano fingers, wherein the first electrode and the second electrode apply static field to bias.

* * * * *